United States Patent [19]

Cummings et al.

[11] 4,064,640

[45] Dec. 27, 1977

[54] FOUR-POINT GROUND REACTION FOR SKID EQUIPPED HELICOPTERS

[75] Inventors: Thomas R. Cummings; Anthony J. Mazza, Jr., both of Binghamton, N.Y.

[73] Assignee: The Singer Company, Binghamton, N.Y.

[21] Appl. No.: 647,254

[22] Filed: Jan. 7, 1976

[51] Int. Cl.$^2$ ............................................. G09B 9/08
[52] U.S. Cl. ................................... 35/12 K; 35/12 P
[58] Field of Search .................. 35/12 R, 12 K, 12 P, 35/12 W

[56] References Cited

U.S. PATENT DOCUMENTS

| | | | |
|---|---|---|---|
| 2,358,016 | 9/1944 | Link et al. | 35/12 P |
| 3,089,257 | 5/1963 | Goodwin | 35/12 P |
| 3,281,962 | 11/1966 | Pancoe | 35/12 P |
| 3,559,936 | 2/1971 | Guyon | 35/12 P |
| 3,577,659 | 5/1971 | Kail | 35/12 P |
| 3,645,014 | 2/1972 | Bramson et al. | 35/12 K |
| 3,886,334 | 5/1975 | Cummings et al. | 35/12 R X |

Primary Examiner—William H. Grieb
Attorney, Agent, or Firm—James F. Duffy; James C. Kesterson

[57] ABSTRACT

Apparatus and method for simulating "light-on-skids" maneuver of a skid-equipped helicopter by treating the aircraft as having four landing struts.

4 Claims, 3 Drawing Figures

FOUR-POINT GROUND REACTION FOR SKID EQUIPPED HELICOPTERS

BACKGROUND

The invention herein described was made in the course of or under a contract, or subcontract thereunder, with the Department of the Navy.

FIELD OF THE INVENTION

The invention herein described relates to aircraft simulator training devices and more particularly to helicopter simulators for performing "light-on-skids" ground maneuvers.

PRIOR ART

Motion systems for aircraft simulator devices are well known. Reference is here made to U.S. Pat. Nos. 3,281,962; 3,559,636 and 3,557,659 as being typical of inventions providing a moving platform to provide motion cues to a trainee operator in a simulated aircraft cockpit mounted atop the moving platform.

Such motion platforms are coupled with computer systems which, responsive to the trainee's manipulation of the cockpit controls, provide drive signals to move the platform to simulate the response cues the actual aircraft would experience were a pilot in flight to move the controls in the same manner as the trainee of the grounded simulator. To duplicate these motion cues in as near exact a manner as possible, the particular aircraft to be simulated is analyzed by simulator system designers and equations of motion, and various aircraft constants, are derived and provided to the computer. When the trainee moves the simulator controls the information is fed to the computer, where the data are operated upon, using the aircraft constants and equations of motion stored there, to provide concomitant drive signals to the motion system. A better understanding of this background material may be gleaned from a review of U.S. Pat. No. 3,886,334, by Cummings, a co-inventor herein, and Hewitt, "Method and Apparatus for Simulating a Class of Aircraft," which is incorporated herein by reference. All U.S. patents referred to herein have been assigned to The Singer Company, New York, New York.

A particular challenge to simulator design engineers has been the simulation of helicopter aircraft. This is particularly true in the simulation of the landing and take-off of such aircraft. In the past in simulating the landing of a helicopter, each skid was treated individually and a ground proximity range was suggested, in which, when the aircraft came within the proximity range, it was assumed either to have landed or taken off. The effect of this was that the helicopter would seem to be propelled instantaneously from the ground on take off, or, when the pilot was landing, it became instantaneously affixed to the ground as soon as it entered the ground proximity region. Under the prior art scheme the pilot was unable to execute the so-called "light on the skids maneuver" which allows the pilot to tip up on his skids and rotate the aircraft or move lightly over the ground while still being in contact therewith. It was the inability of the prior art system to react with the ground which led to the unrealistic results accruing at landing and take-off.

SUMMARY OF THE INVENTION

The present invention, rather than analyzing the helicopter as an aircraft having two landing skids, treats it as an aircraft having four landing points which interact with the ground. For ease of discussion and analysis, these points are designated as being those points at which each skid is attached to the aircraft by means of struts. The fore and aft strut attachment points on each skid are the points at which the helicopter is assumed to be reacting with the ground.

The inventors then consider the ground forces reacting on these points and the moment arms about them as the helicopter maneuvers about these points. (A moment arm is the distance from the center of gravity of the helicopter to one of these strut attach points.) These forces and the moments are calculated including the effect of these forces as they interact on the ground and as they are offset or supplemented by the force of the jet or of the rotor thrust. All these effects are combined with the result that an extremely realistic landing or take-off may now be simulated using the apparatus disclosed.

A pilot can approach the ground, feel his craft make contact with it and still maneuver using the light on the skid maneuver. He may take off in a similar manner. No abrupt change in flight characteristics such as is present in prior art systems is encountered.

An important concept of the invention is the use of at least two points on each skid which to determine reaction forces. These points, being separated, allow the inventors to compute and simulate characteristics, such as the effect of banking and pitching on the skid, which were not possible under prior art in which each skid was considered to be a single point of contact with the ground. The system designer can assume and calculate the forces that are present as, say, the pilot trainee tips up about the aft ends of the skids and pivots. The invention provides the means to simulate these forces as the pilot so maneuvers, a provision not present in the prior art system.

DETAILED DESCRIPTION OF THE INVENTION

In order to simulate the "light-on-skids" take-off procedure of a helicopter, the invention treats each skid attach point as a landing strut and provides apparatus and method for determining the ground reaction at each attach point by the summation of forces and moments about the nominal center of gravity of the particular aircraft being simulated.

As the aircraft reacts with the ground, each landing strut will experience compressive forces which will vary in amplitude as the state of the helicopter changes, i.e., as the helicopter is airborne, semi-airborne (reacting with the ground), or at rest on the ground.

The system may be described as a damped harmonic system in which the second order terms; acceleration, in this instance; are approximately zero and may be neglected without noticeable degradation of the simulation.

Figure 1:
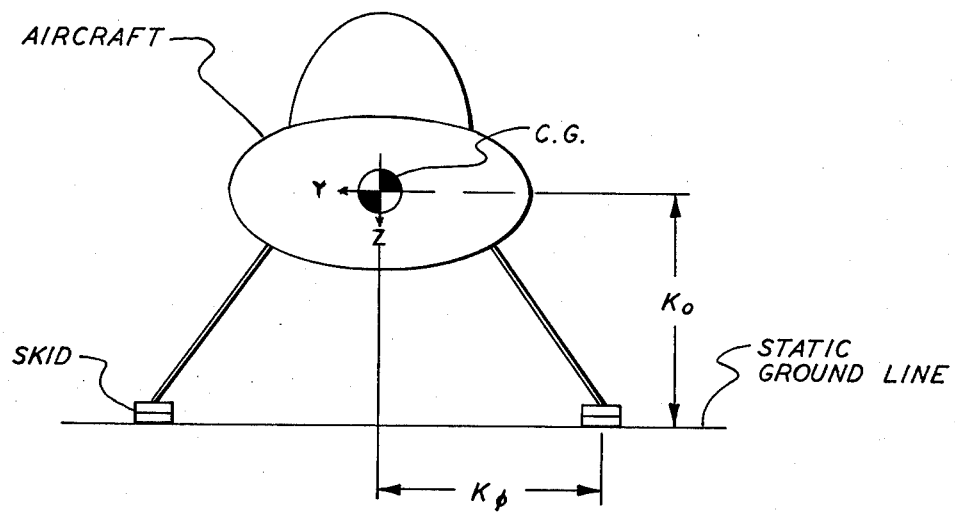
FIG. 1 illustrates physical constants $K_o$ and $K_\phi$.
Figure 2:
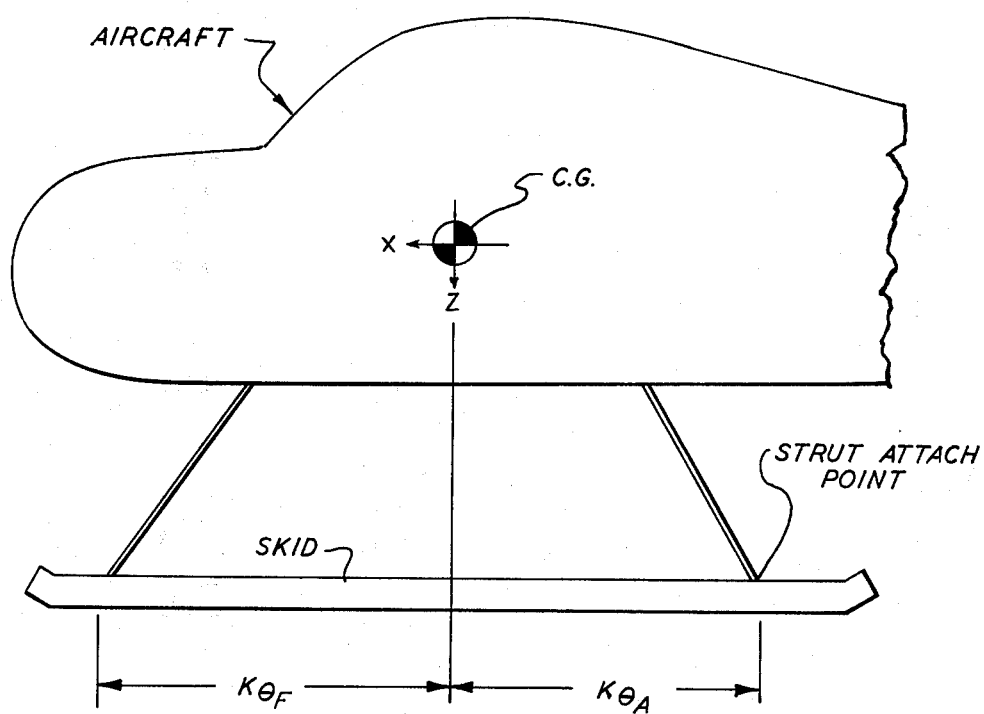
FIG. 2 illustrates physical constants $K_{\theta F}$ and $K_{\theta A}$.

Using the X, Y, Z coordinate axes indicated in FIG. 1 and the following conventions: Pitch is positive when the nose of the aircraft is up; Bank or roll is positive when left side of craft is down; the strut compression equations may be defined as follows:

$$\delta_{S_{LF}} = (K_o - h_{GR} - K_{\Theta_F} \sin \Theta - K\phi \sin \phi - K_q \dot{\Theta} - K_h \dot{h}) \oplus \text{Eq. 1}$$

$$\delta_{S_{LA}} = (K_o - h_{GR} + K_{\Theta_A} \sin \Theta - K\phi \sin \phi - K_q \dot{\Theta} - K_h \dot{h}) \oplus \text{Eq. 2}$$

$$\delta_{S_{RF}} = (K_o - h_{GR} + K_{\Theta_F} \sin \Theta - K\phi \sin \phi - K_q \dot{\Theta} - K_h \dot{h}) \oplus \text{Eq. 3}$$

$$\delta_{S_{RA}} = (K_o - h_{GR} + K_{\Theta_A} \sin \Theta - K\phi \sin \phi + _q \dot{\Theta} - K_h \dot{h}) \oplus \text{Eq. 4}$$

in which the subscripts indicate Left and Right, Fore and Aft strut compression and $K_o$, $K_\phi$, $K_{\Theta_F}$ and $K_{\Theta_A}$ are distances defined in FIG. 1 and FIG. 2 and $K_o$ is measured when the strut is uncompressed.

$h_{GR}$ is the ground reaction altitude. This measurement is analogous to $K_o$ but, since it varies as the struts compress in reacting with the ground, $h_{GR}$ will assume values less than or equal to $K_o$ in the calculations concerned.

$K_q$ is the pitch damping constant
$K_h$ is the vertical speed damping constant
$\Theta$ is the pitch angle
$\phi$ is the bank or roll angle
$\dot{\Theta}$ is the pitch velocity
$\dot{h}$ is the earth axis vertical velocity The sign $\oplus$ refers to the so-called "zero slice" and indicates that the equation is never to be allowed to assume a value less than zero.

For small angle approximations, which hold here, sin $\Theta$ and sin $\phi$ may be taken as $\Theta$ and $\phi$ respectively, both in radians.

The ground reaction force on a landing strut when the aircraft is sitting on the ground with all rotors and jets off may be defined in general as $$F_{Z_S} = \frac{W_s}{\delta_{S \max}^2} \delta_S^2 \qquad \text{Eq. 5}$$

in which $W_s$ is the weight on the strut and $\delta_S \max$ is the maximum strut compression. Thus, the force on the left fore strut is given by $$F_{Z_{LF}} = \frac{W_{S_{LF}}}{\delta_{S_{LF_{max}}}^2} \delta_{S_{LF}}^2$$

The forces on the remaining struts may be expressed in similar manner.

The total of these forces may be derived as $$F_{Z_{GI}} = F_{Z_{LF}} + F_{Z_{LA}} + F_{Z_{RF}} + F_{Z_{RA}}$$

The ground reaction forces due to drag of the skids then become $$F_{X_{FR}} = F_{Y_{FR}} = \mu F_{Z_{GT}}$$

where $\mu$ is the coefficient of friction (about 0.4 for a 10,000 pound skid-equipped helicopter).

A final summation of forces must include the thrust of the jet along the x-axis, $F_{X_J}$, the main rotor force along the X-axis, $F_{X_{BF}}$, and the main rotor force along the y-axis, $F_{Y_{BF}}$.

The total ground reaction force along the x-axis may be expressed as $$F_{X_{GJR}} = -K_D U_a$$

if $(F_{X_{BF}} + F_{X_J} - F_{X_{FR}}) = A < O$, or $$F_{X_{GJR}} = -K_D U_a + A \text{ if } A \geq O$$

where $U_a$ is the longitudinal velocity, i.e., along the x-axis, and $K_D$ is that force required to keep the aircraft from drifting along the ground. In other words $K_D$ is that force necessary to overcome $F_{X_{FR}}$, the drag reaction force of the skid.

The total ground reaction force along the y-axis may be expressed as $$F_{Y_{GR}} = -K_D V_a$$

if $(F_{Y_{BF}} - F_{Y_{FR}}) = B < O$, or $$F_{Y_{GR}} = -K_D V_a + B \text{ if } B \geq O$$

where $V_a$ is the lateral velocity, i.e., along the y-axis.

Having defined the forces, the moments about the nominal center of gravity may be expressed as $$M_{X_G} = K_\phi (F_{Z_{RF}} + F_{Z_{RA}} - F_{Z_{LF}} - F_{Z_{LA}}) - K_o F_{Y_{GR}},$$

$$M_{Y_G} = K_{\Theta_F}(F_{Z_{LF}} + F_{Z_{RF}}) + K_{\Theta_A}(F_{Z_{LA}} + F_{Z_{RA}}) + K_o F_{X_{GJR}},$$

and $$M_{Z_G} = K_\phi F_{X_{GJR}} (\Delta \delta_S / | \Delta \delta_S |)$$

where $$\Delta \delta_S = \delta_{S_{RF}} + \delta_{S_{RA}} - \delta_{S_{LF}} - \delta_{S_{LA}},$$

the Right minus the Left strut deflections.

It may now be seen that by treating the skid equipped helicopter as an aircraft equipped with four landing struts, rather than two skids, the effect of pitch and bank maneuvers, while the craft is still in contact with the ground, may be simulated.

Figure 3:
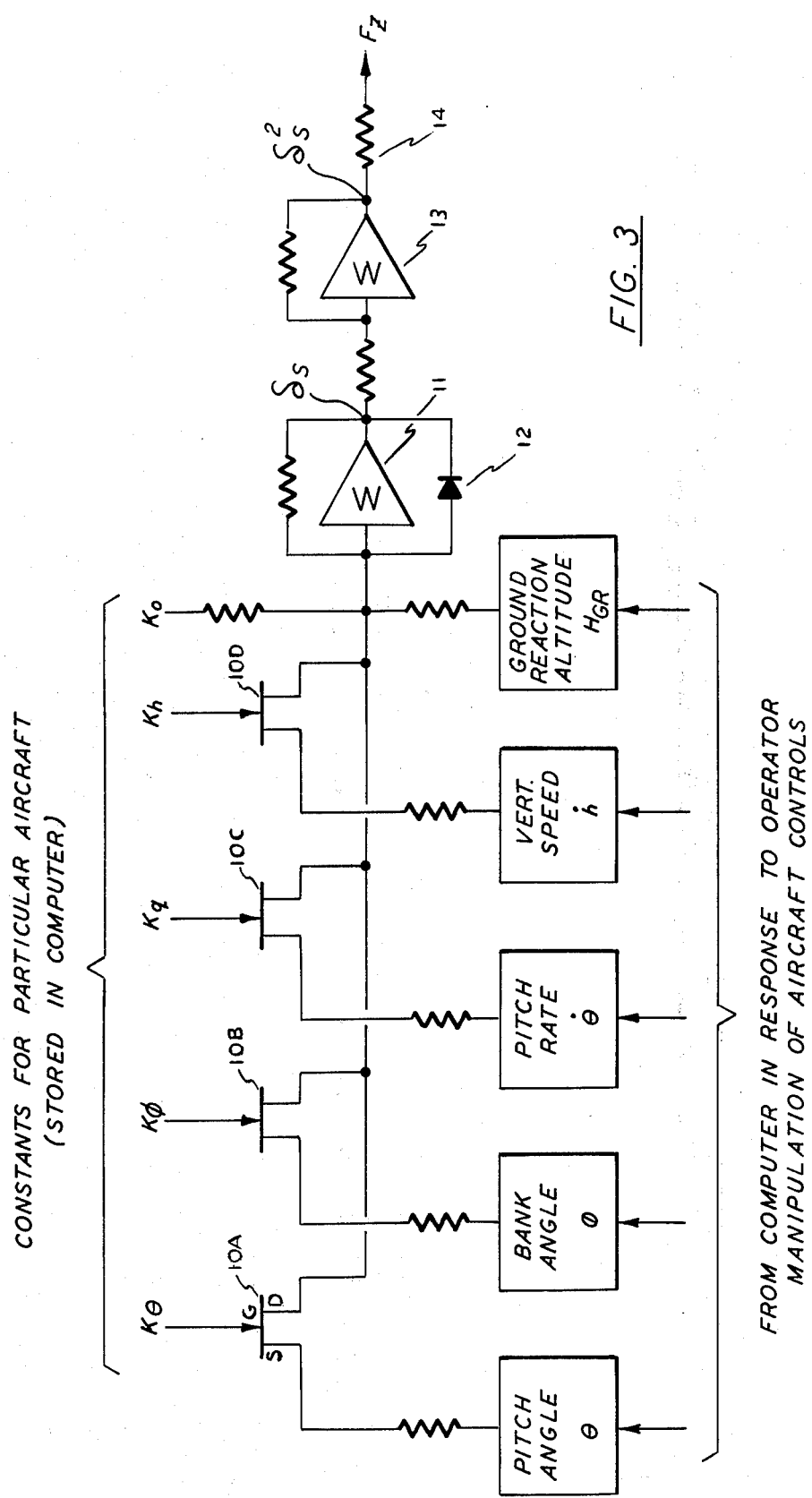
FIG. 3 is a schematic block diagram depicting the derivation of one vertical force vector (four of which vectors must be derived in practicing the invention).

FIG. 3 illustrates the apparatus by which the strut compressions and vertical forces may be derived for any aircraft state determined as a function of the aircraft controls. FIG. 3 represents one of four similar systems; there being one each for the left-fore strut, the left-aft strut, the right-fore strut and the right-aft strut; with particular constants and dynamic responses peculiar to the strut in question being provided, e.g., $K_\Theta$ of FIG. 3 would be $K_{\Theta_A}$ or $K_{\Theta_F}$ in actual practice, as required, with sign, plus or minus, determined by the strut's location, aft or forward of the nominal center of gravity respectively.

As indicated in the background discussion, the various constants and equations of motion are stored in a computer which also is responsive to operator manipulation of the simulated aircraft's controls. In FIG. 3 constant multipliers of the dynamic control responses are applied to the gate of field effect transistors (FET) 10. The dynamic control responses are applied to the source of FET's 10. The drains of all FET's 10 are connected to the input of summing amplifier 11. Thus FET 10A provides a signal $K_\Theta \Theta$, 10B provides $K_\phi \phi$, 10C supplies $K_q \Theta$ and 10D outputs $K_h h$.

Constant $K_o$ and dynamic ground reaction altitude $H_{GR}$ are also provided as an input to summing amplifier 11. The output of amplifier 11 will be the strut compression $\delta_S$ of the strut in question, as established by the relationships set forth in equations 1 through 4. Limiter 12 restrains the magnitude of $\delta_S$ to values which are never less than zero.

Amplifier 13 accepts $\delta_S$ at its input and provides the squared value, $\delta_S^2$, at its output, which is applied to resistor 14, selected to provide a constant, $W_S/\delta_S^2$ max, so that the output from resistor 14 is a signal having a magnitude associated with the force, $F_Z$, in accordance with equation 5.

As already noted, four systems such as depicted in FIG. 3 are provided in practicing the invention so that forces $F_{z_{LF}}$, $F_{z_{LA}}$, $F_{z_{RF}}$ and $F_{z_{RA}}$ are derived in response to operator control of the simulator. These force signals are then operated on by the computer in conjunction with the equations of motion of the particular aircraft being simulated. With the $F_Z$ forces determined, all other forces and moments may be derived conventionally within the computer.

Because the equations of motion now include ground reaction terms for each of the four landing struts, the "light-on-skids" maneuver may be simulated using the computer output to control the motion system in conventional manner as indicated in the background discussion.

Apparatus and method to simulate realistic ground handling of a skid equipped helicopter have been presented. Student pilots may now receive adequate training in various take-off and landing procedures associated with skid equipped helicopters, such as the "light-on-skids" maneuver. This is accomplished by considering each strut attach point to be an individual landing strut independent of all other struts and skids. It should be obvious to those skilled in the art that various changes and modifications may be made without departing from the invention. It is therefore intended to cover herein all such changes and modifications as fall within the true spirit and scope of the invention.

The embodiment discloses method and apparatus for simulating ground reaction maneuvers considering four points of the aircraft as reacting with the ground. The four point reaction concept is considered the best embodiment of a highly dynamic simulation situation from the standpoint of the designer implementing the invention and the realism experienced by the trainee operator of the simulator.

In a static situation it is relatively simple to resolve all the forces to one or two reaction points, however, in the dynamics of ground maneuvers, the realism would suffer and the implementation would become more involved. Using two reaction points, it would be possible to execute the light-on-skids maneuver but there would be a tendency for the aircraft to "pop-off" the ground at take off. To avoid this sudden and unrealistic ground release the computation of $h_{GR}$ becomes more involved and it is required that the c.g. of the craft be translated as the craft is manipulated.

Using one reaction point it would be most difficult to control the aircraft attitude as the craft is rotated while making the light-on-skid maneuver. For all these reasons the four point reaction concept is deemed most practical.

What we claimed is:

1. In an aircraft simulator comprising a simulated aircraft cockpit with controls operable by a trainee, said cockpit being mounted on a moving platform which is coupled to a computer system responsive to the trainee's manipulation of the cockpit controls to provide drive signals to move the platform to simulate the response cues the actual aircraft would experience were a pilot to move the controls of the aircraft in the same manner as the trainee operator of the simulator aircraft, a method for simulating realistic ground handling of a skid-equipped helicopter comprising the steps of:
   a. storing in said computer system the aircraft dynamic control responses, the constant multipliers of said dynamic control responses, and the equations of motion representative of a selected skid-equipped helicopter;
   b. deriving first signals representative of helicopter ground reaction forces resulting at each skid's strut attach points from said trainee's manipulation of said cockpit controls;
   c. combining said first signals representative of ground reaction forces with the data stored in said computer system representative of said selected skid-equipped helicopter so as to derive conventionally within said computer system second signals representative of all other forces and moments affecting said helicopter as a result of said trainee's manipulation of said cockpit controls;
   d. driving said aircraft simulator into motion in response to said second signals to provide response cues for said trainee operator to react to similar to the response cues provided by said actual, selected skid-equipped helicopter whereby, the signals representative of aircraft motion now including ground reaction affects for each strut attach point, the "light-on-skids" maneuver may be experienced by said trainee.

2. In an aircraft simulator comprising a simulated helicopter cockpit with controls operated by a trainee, said cockpit being mounted on a moving platform which is coupled to a computer system responsive to said trainee's manipulation of said cockpit controls so as to provide drive signals to move the platform to simulate the response cues the actual helicopter would provide were a pilot to move the controls of the actual helicopter in the same manner as the trainee operator of the simulator helicopter, apparatus for simulating realistic ground handling of a skid-equipped helicopter comprising:
   a. means to store in said computer system the dynamic control responses, the constant multipliers of said dynamic control responses, and the equations of motion representative of a selected skid-equipped helicopter;
   b. means to derive first signals representative of the ground reaction forces resulting at each helicopter skid's strut attach points as a result of said trainee's manipulation of said cockpit controls;
   c. means to combine within said computer system said first signals representative of ground reaction forces and the data stored in said computer representative of said selected skid-equipped helicopter so as to derive from said combination second signals representative of all other forces and moments affecting said helicopter as a result of said trainee's manipulation of said cockpit contols; and
   d. means to drive said moving platform in response to said second signals so as to provide response cues for said trainee to react to which cues are similar to the response cues provided by said actual selected skid-equipped helicopter whereby, said second signals now including the effect of ground reaction for each strut attach point, the "light-on-skids" maneuver may be experienced by said trainee.

3. The apparatus of claim 2 wherein the means for deriving first signals representative of ground reaction forces at each helicopter skid's strut attach points comprise:
   a. means for deriving signals which result from multiplying said constant multipliers of the helicopters dynamic control responses by the associated dynamic control responses generated by the trainee's manipulation of the cockpit controls;
   b. means to derive within said computer system a signal representative of the compressive variation of the distance between the helicopter's center of gravity and each strut attach point as the helicopter reacts with the ground;
   c. summing means to derive a signal $\delta_S$ representative of the algebraic sum of said signals derived in a) above and said signal derived in b) above;
   d. squaring means to derive a signal $\delta_S^2$; and
   e. means to derive a signal representative of the product of $\delta_S^2$ and a constant defined by the ratio $W_s/\delta_{S\,max}^2$.

4. In an aircraft simulator comprising a simulated helicopter cockpit with controls operated by a trainee, said cockpit being mounted on a moving platform which is coupled to a computer system responsive to said trainee's manipulation of said cockpit controls so as to provide drive signals to move the platform to simulate the response cues the actual helicopter would provide were a pilot to move the controls of the actual helicopter in the same manner as the trainee operator of the simulator helicopter, a method for simulating realistic ground handling of a skid-equipped helicopter comprising the steps of:
   a. storing data in said computer system representative of constants $K_o$, $K_\phi$, $K_\Theta$, $K_q$, $K_h$, and the equation of motion of a selected skid-equipped helicopter including dynamic variables $h_{GR}$, $\Theta$, $\phi$, $\Theta$ and h,
   b. deriving signals in response to said trainee's manipulation of said cockpit controls which signals are representative of ground reaction forces
      i. $F_Z$, compressive forces at each skid strut attach point,
      ii. $F_{Z_{GT}}$, total compressive force on all skids
      iii. $F_{X_{GJR}}$, the X-axis force
      iv. $F_{Y_{GR}}$, the Y-axis force
   c. combining said ground reaction force signals with the data stored in said compute system representative of said skid-equipped helicopter so as to derive signals representative of moments about the nominal center of gravity, said moments comprising $M_{X_G}$, $M_{Y_G}$ and $M_{Z_G}$ as well as other forces or moments affecting said helicopter as a result of said trainee's manipulation of said cockpit control;
   d. driving said helicopter simulator into motion in response to said signals derived in step c above so as to provide response cues for said trainee-operator to react to similar to the response cues provided by said actual, selected skid-equipped helicopter whereby said trainee may now execute the "light-on-skids" helicopter ground maneuver since the signals used to drive the aircraft simulator motion platform now provide the effect of ground reaction at each skid strut attach point.

* * * * *

UNITED STATES PATENT AND TRADEMARK OFFICE
CERTIFICATE OF CORRECTION

PATENT NO. : 4,064,640

DATED : December 27, 1977

INVENTOR(S) : Thomas R. Cummings et al

It is certified that error appears in the above−identified patent and that said Letters Patent are hereby corrected as shown below:

In Fig. 3 and Drawing on Abstract Page: $\Sigma$ symbol in amplifier 13 should be a $\int^2$ symbol.

Signed and Sealed this

Second Day of January 1979

[SEAL]

Attest:

RUTH C. MASON
*Attesting Officer*

DONALD W. BANNER
*Commissioner of Patents and Trademarks*